United States Patent [19]

Ito et al.

[11] 4,166,683
[45] Sep. 4, 1979

[54] FOLDABLE PHOTOGRAPHIC APPARATUS

[75] Inventors: Fumio Ito; Mutsunobu Yazaki, both of Yokohama, Japan

[73] Assignee: Canon Kabushiki Kaisha, Tokyo, Japan

[21] Appl. No.: 820,321

[22] Filed: Jul. 29, 1977

[30] Foreign Application Priority Data

Jul. 30, 1976 [JP] Japan .................................. 51-91092

[51] Int. Cl.$^2$ ....................... G03B 13/06; G03B 17/04
[52] U.S. Cl. ...................................... 354/192; 354/86; 354/219
[58] Field of Search ................. 354/83, 126, 149, 187, 354/192, 193, 199, 219, 84, 85, 86

[56] References Cited

U.S. PATENT DOCUMENTS

| Re. 26,763 | 1/1970 | Hennig et al. | 354/149 |
|---|---|---|---|
| 3,683,770 | 8/1972 | Land et al. | 354/193 X |
| 3,877,047 | 4/1975 | Douglas | 354/193 X |
| 4,016,580 | 4/1977 | Finelli | 354/193 X |

Primary Examiner—Michael L. Gellner
Attorney, Agent, or Firm—Toren, McGeady and Stanger

[57] ABSTRACT

The present invention relates to a foldable photographic apparatus having a photographic optical system and a view finder optical system, being separately provided from each other which is characterized in that the finder optical system is divided into a first finder optical system group provided in a housing section in which at least a portion of a photographic lens system of said photographic optical system is provided and a second finder optical system group retained in another housing section, wherein these first and second finder optical system groups can move against each other.

11 Claims, 7 Drawing Figures

FOLDABLE PHOTOGRAPHIC APPARATUS

BACKGROUND OF THE INVENTION

1. Field of the Invention

The present invention relates to a foldable photographic apparatus.

2. Description of the Prior Art

A foldable photographic apparatus has been introduced in a variety of models heretofore, and particularly recently it is found in a large number in a photographic apparatus using film units of a self-developing type, that is, so-called "instant photographic apparatus." Such an instant photographic apparatus uses sheet shape film units of self-developing type such as the one disclosed in the specification of the U.S. Pat. No. 3,682,076, etc. Such film units do not employ a method wherein a negative image only is formed on a film, then said negative image is enlarged, for forming a positive image on another photographic paper like an ordinary 35-mm size roll film. Instead it employs a method wherein a positive image is formed directly on an exposure surface being exposed, then said image is to be seen and appreciated in its very size without being enlarged, therefore if a film size is too small, it is hard to see and appreciate the same. Thus the size of a film unit of a self-developing type is much larger than that of a roll film of said 35-mm size. Therefore a shape of a photographic apparatus itself becomes larger resulting in poor portable characteristics.

Because of this reason, various design improvements have been made to fold an instant photographic apparatus when it is not in use or it is carried around into a neat and compact shape so that it can be placed in a pocket of a photographer for carrying.

As a typical example of such foldable photographic apparatus, there is a self-developing photographic apparatus as disclosed in the specification of U.S. Pat. No. 3,810,211. Said apparatus is made as a photographic apparatus of the TTL type in which an object light beam passing through a photographic lens system is selectively guided by a reflecting mirror provided within an exposure chamber to a finder optical system and an exposure position at which said film unit is positioned. However, said photographic apparatus has the shortcomings wherein an optical path of said finder optical system must be temporarily closed to prevent external light coming in from the finder optical system in an adverse manner from exposing the film unit, and a shutter mechanism for that purpose involves complicated structure, and, further, a photographer viewing through said finder optical system can not see an object when the film unit is being exposed.

Because of this reason, in place of a photographic apparatus of TTL a foldable photographic apparatus in which an object can be seen even during exposure of a film unit by providing a finder optical system which is independent from a photographic optical system is shown in the specification of the U.S. Pat. No. 3,678,830, etc. In this photographic apparatus, a housing section having said photographic optical system provided therein and a housing section having said finder optical system provided therein are placed at positions entirely different from each other. Therefore, if a photographer wants to make focusing adjustment of said photographic optical system while viewing through a finder optical system, various complicated linking mechanisms are required for making associated adjustment between a finder optical system and a photographic optical system which are largely separated from each other by one adjustment member. Thus, the associated arrangement is quite complicated.

SUMMARY OF THE INVENTION

A first object of the present invention is to provide a foldable photographic apparatus which has a very simple mechanism and is quite easy to operate, eliminating the shortcomings of a conventional foldable photographic apparatus.

A second object of the present invention is to provide a foldable photographic apparatus having a finder optical system which is divided into a first finder optical system groups provided in a housing section in which a photographic lens system is placed and a second finder optical system group retained in another housing section wherein both of the groups can work on each other.

A third object of the present invention is to provide a foldable photographic apparatus in which an optical axis of said first optical system and an optical axis of said second optical system are so regulated as coinciding with each other always when said photographic apparatus is brought into an operative condition from a folded condition, in addition to the above mentioned objects.

A fourth object of the present invention is to provide a foldable photographic apparatus of a self-developing type satisfying the above mentioned objects.

Further other objects of the present invention will become apparent from the specification and the drawings which will be explained below in detail.

BRIEF DESCRIPTION OF THE DRAWINGS

FIG. 1 to FIG. 7 show a foldable photographic apparatus according to the present invention, wherein FIG. 1 and FIG. 2 are external side elevation, and FIG. 1 shows a state in which photographing can be done immediately, while FIG. 2 shows a state in which an apparatus is folded so as to be convenient for carrying around.

FIG. 3 is an external plan in which said apparatus is viewed from upper direction in a state the apparatus is folded as in FIG. 2.

FIG. 4 is a cross sectional view taken along the line III—III in FIG. 3 in a state of FIG. 1, while FIG. 5 is a cross sectional view taken along the line III—III of FIG. 3 in a state of FIG. 2, but the cross section of a housing section 2 and the view finder housing 4 are not shown in FIG. 5.

FIG. 6 is an external plan in which an apparatus is viewed from upper direction in a state of FIG. 1.

FIG. 7 is an external plan in which an apparatus in a state of FIG. 1 is viewed from a front direction of a housing section 2.

DESCRIPTION OF THE PREFERRED EMBODIMENTS

Now, an example of a foldable photographic apparatus according to the present invention will be explained taking a foldable photographic apparatus of a self-developing type as an example.

Figure 1:
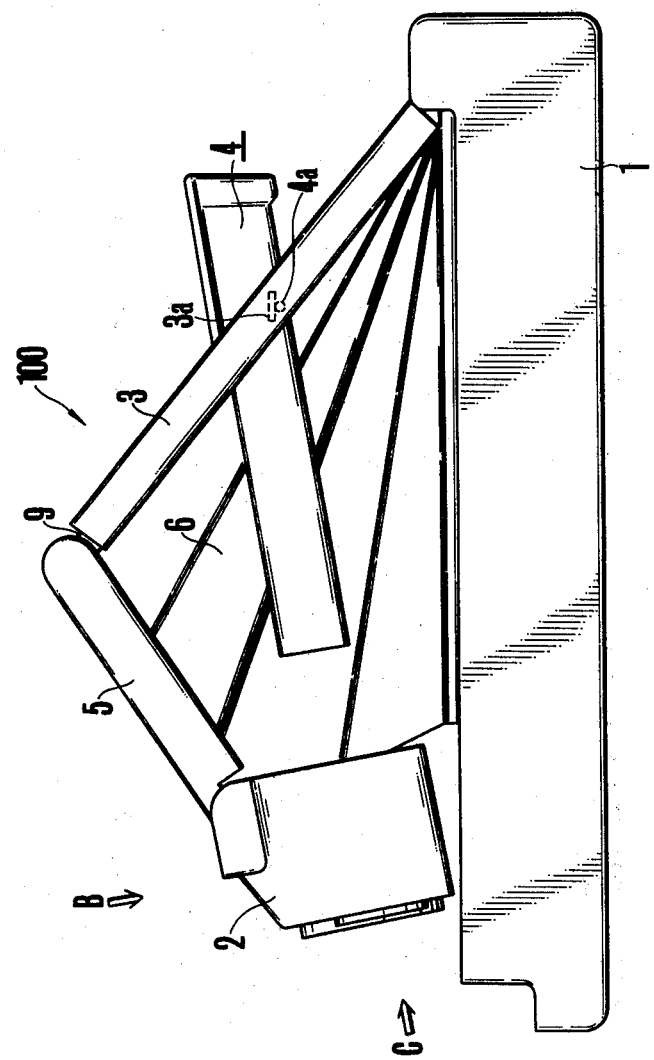
Figure 2:
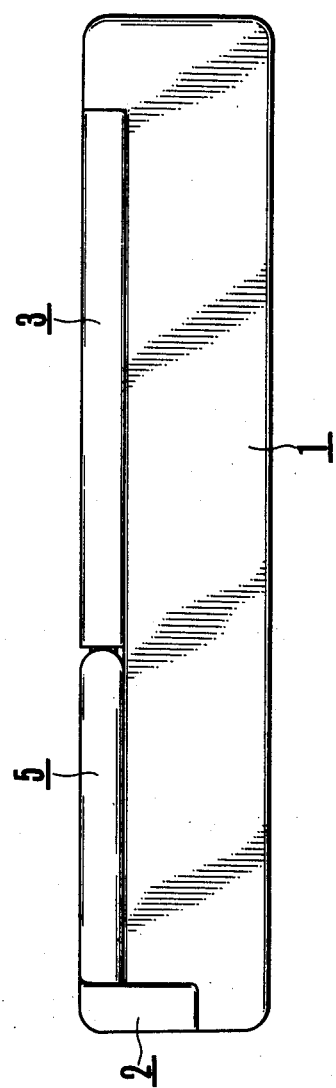
Figure 3:
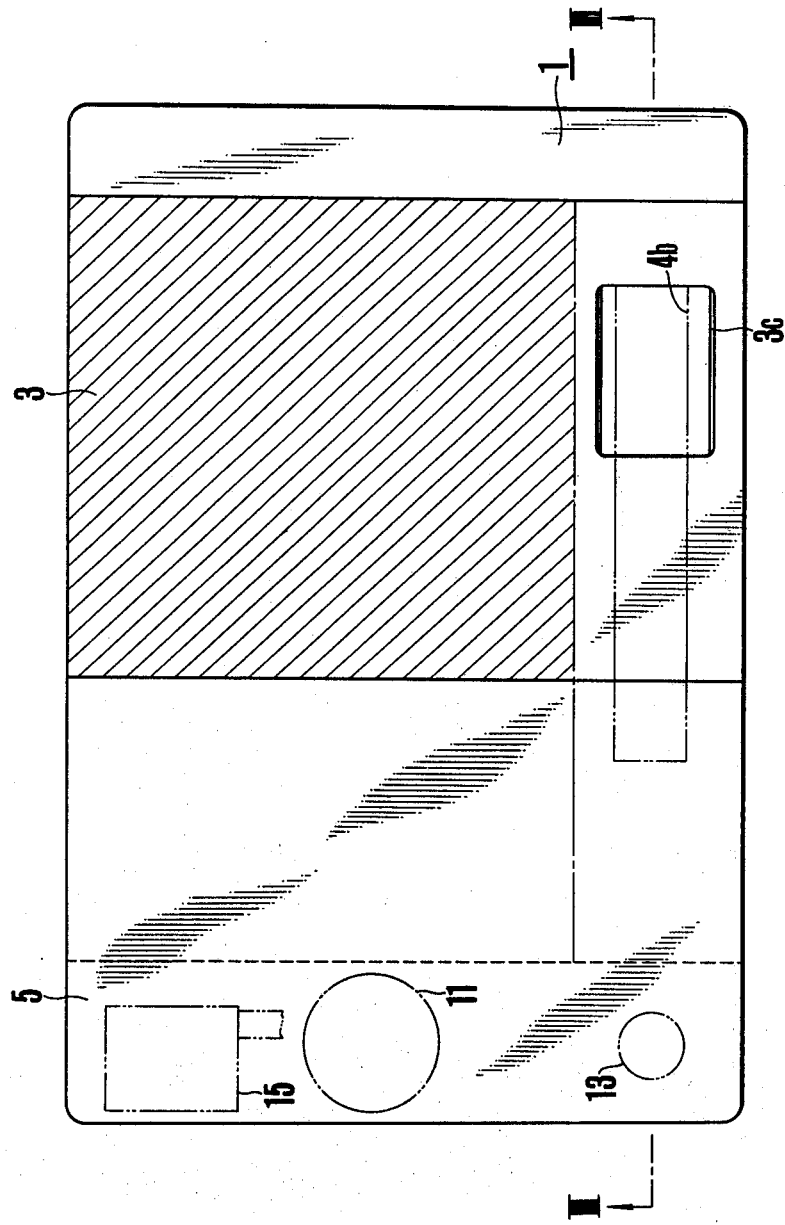
Figure 4:
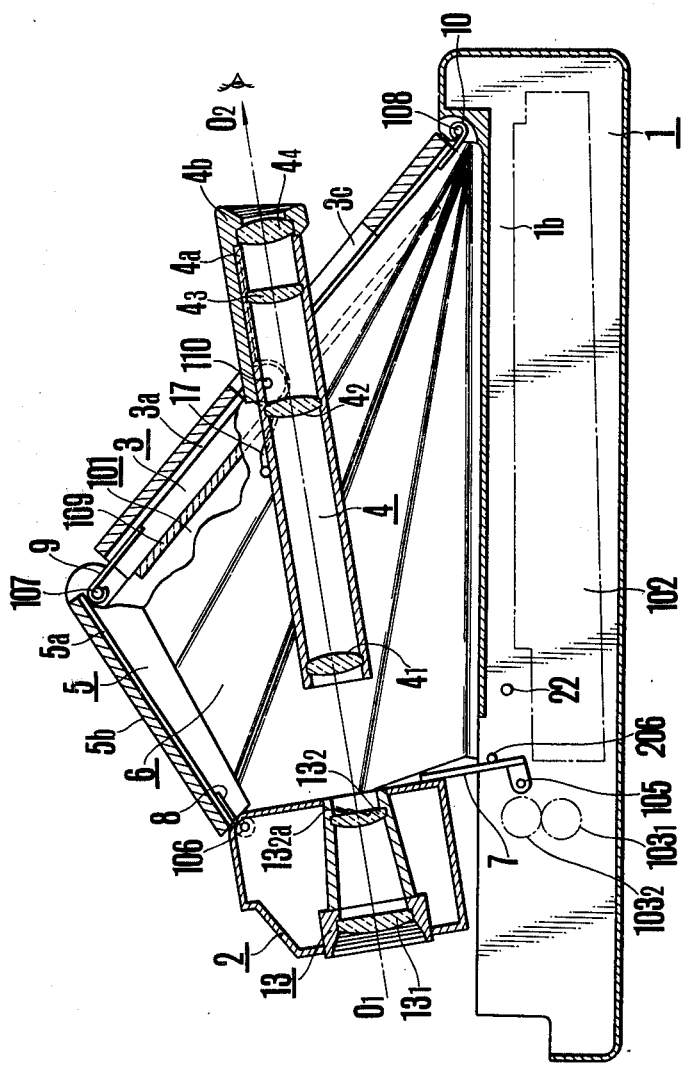
Figure 5:
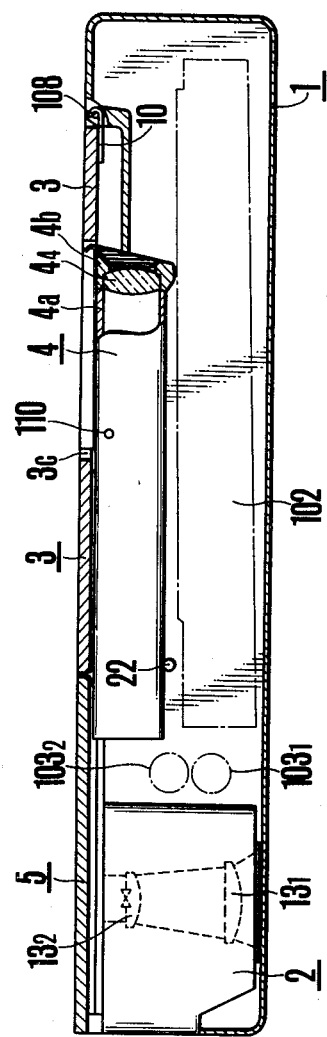
Figure 6:
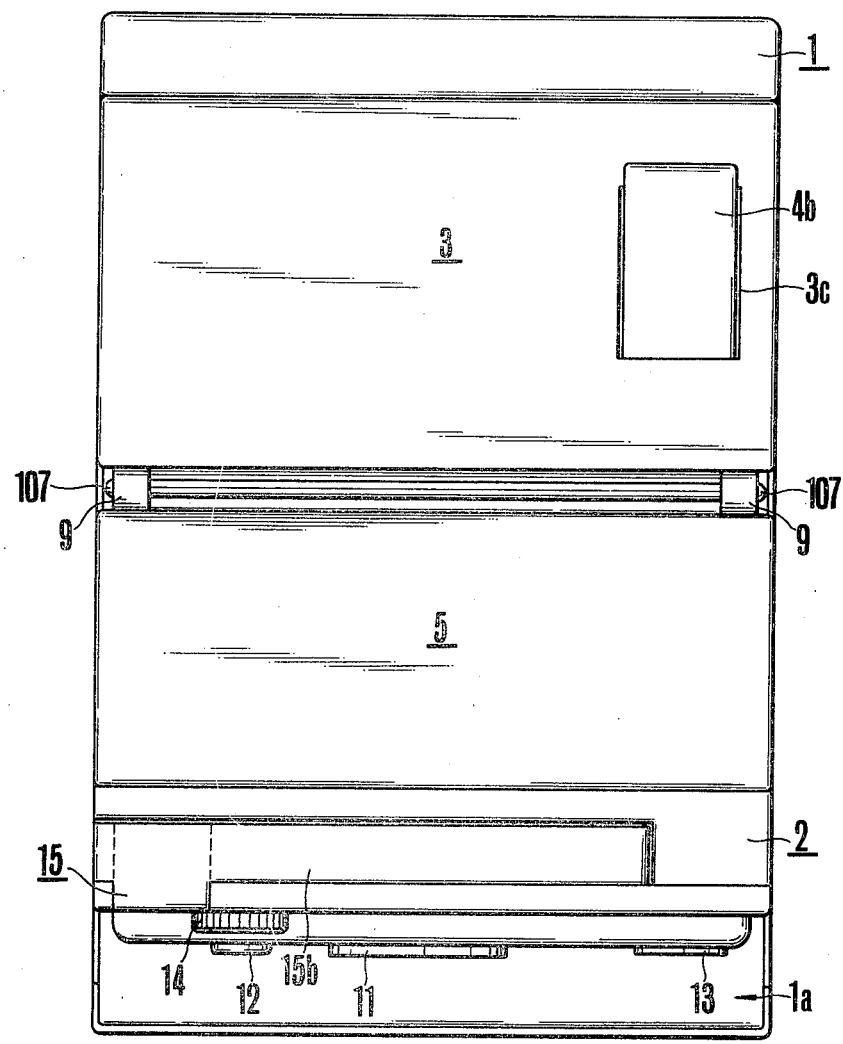
Figure 7:
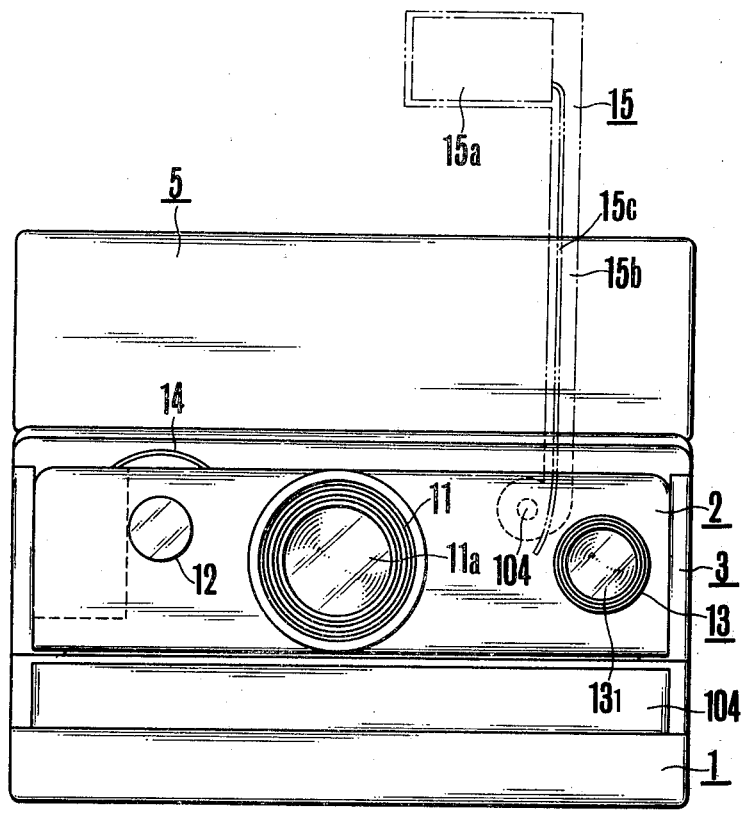

A photographic apparatus has a plurality of housing sections 1, 2, 3 and 5 which cooperate with a flexible opaque bellows 6 to define sides of an exposure chamber 101. These housing sections 1, 2, 3 and 5 are pivotally coupled with the housing sections adjacent to each other. Also a view finder housing 4 positioned in rear of said housing section 2 is so pivotally coupled with said housing section 3 as being positioned at outside of said exposure chamber 101 formed by the housing sections 1, 2, 3 and 5. And said view finder housing 4 is placed in an obliquely slanted state against said housing section 3 when said housing sections 1, 2, 3 and 5 are in an operative condition ready for photographing shown in FIGS. 1, 4, 6, 7, and contrary to above, when the housing sections 1, 2, 3 and 5 are in a folded condition as shown in FIGS. 2, 3, 5, it is folded in a state about parallel to said housing section 3 together with the housing sections 1, 2, 3 and 5. Therefore, said photographic apparatus is placed in a neat and compact shape in a state in which said apparatus is folded down, thus it can be carried around being placed in a pocket of a photographer.

A cassette chamber to which a film cassette 102 is loaded, and a chamber 1a to house said housing section 2 within said housing section 1, further a chamber 1b to house said view finder housing 4 when the photographic apparatus is in said folded condition are formed within the housing section 1. And as said film cassette 102, for example, such cassette as shown in U.S. Pat. No. 3,682,076 is used. That is, a plurality of thin flexible sheet shape film units are laid up one by one and are housed in the film cassette 102. Said film unit has a bag storing developing liquid within said film unit. And said film unit is advanced to outside of the housing section 1 by a film-advancing device provided within the housing section 1 after exposure, and said photographic apparatus is so made that said film unit passes between a pair of rollers $103_1$, $103_2$ being elastically pressed each other as said film unit is advanced to outside of said housing section 1 by said film advancing device at the photographic apparatus. And when said exposed film unit passes between the pair of rollers $103_1$, $103_2$, said film unit has said bag which is provided within the same and stores developing liquid broken by the pressing power of said pair of rollers $103_1$, $103_2$ and at the same time said developing liquid flowing out of said bag is spread over said film unit by said pair of rollers $103_1$, $103_2$, thus self-developing process is done. Also, said pair of rollers $103_1$, $103_2$ belong to a part of said film-advancing device and are rotatingly driven in a cooperation with a driving mechanism within said film-advancing device after the film unit is exposed. And in said cassette chamber into which said film cassette 102 housing said film units is loaded, there is provided a means for holding said film cassette 102 in such a manner that a film unit at the uppermost position within said film cassette 102 is properly placed at an exposure position when said film cassette 102 is loaded. Said housing section 2 contains a photographic lens-barrel 11, a program shutter device (not shown in the drawings, a shutter release button 12 to actuate said shutter device, a view finder lens barrel 13 positioned in front of said view finder housing 4 when the photographic apparatus 100 is at the operative condition, an operating dial 14 to operate a coupling device mechanically coupling the photographic lens-barrel 11 and the view finder lens-barrel 13, a foldable flash device, and a plate-shape opaque light shielding member 104. And plural number of photographic lens systems 11a to have object light beam incident into said exposure chamber 101 are provided on a common optical axis within the photographic lens-barrel 11, and a portion of said plural number of photographic lens systems 11a are made movable so that they are so adjusted that object light beam passing through said photographic lens-barrel 11 is properly imaged at said exposure position of the housing section 1. And said photographic lens-barrel 11 and said operating dial 14 are mechanically coupled by a known means in a cooperative relationship so that the shifting of said movable lens systems is done by rotating operation of said operating dial 14. And said program shutter device (not shown in the drawings) to allow the object light beam being incident into said photographic lens-barrel 11 to be incident into said exposure chamber 101 for a determined period of time, which is adjustable, is provided between said photographic lens-barrel 11 and said exposure chamber 101. Also this program shutter device is what is used in an ordinary photographic apparatus and it does not have any special set up in itself. An objective lens system $13_1$ and a condenser lens system $13_2$ are provided within said view finder lens-barrel 13. And said objective lens system $13_1$ can form an object image on a focal surface $13_2a$ of said condenser lens system $13_2$, and can be shifted along its optical axis $0_1$ to adjust the imaging position. And the view finder lens-barrel 13 and the operating dial 14 are mechanically coupled by a known means in a cooperative relationship so that the shifting of said objective lens system $13_1$ can be made by rotating operation of said operating dial 14 as in the movable lens of the photographic lens system 11a. And said view finder lens-barrel 13 and said photographic lens-barrel 11 are so related each other that when an operator rotatingly operates said operating dial 14 while viewing the imaging state at the focal surface $13_2a$ of said condenser lens system $13_2$ in the view finder lens-barrel 13 and the most clear image is formed at the focal surface $13_2a$ of the condenser lens system $13_2$, the object light beam being incident from the photographic lens-barrel 11 is properly imaged at the above mentioned exposure position of the housing section 1 by said photographic lens system 11a. And said foldable flash apparatus 15 is pivotally coupled to said housing section 2 by an axle 104 fixed at the housing section 2. And what is shown as 15a is a flash lamp housing, and 15b is a retainer body holding the flash lamp housing 15a, while 15c is electric cord which goes through said retainer body 15b and electrically connects a flash control circuit (not shown in the drawing) provided within said housing section 2 and said flash lamp housing 15a. What is shown as 7 is a member having its one end pivotally coupled with said housing section 1 by an axle 105 fixed on the housing section 1, and the other end of said member 7 is fixed to a part of said housing section 2. What is shown as 206 is a pin fixed at the housing section 1 and said pin 206 is to restrict the rotation of said member 7 to clockwise direction. That is said housing section 1 and said housing section 2 are pivotally coupled to each other through the member 7, and when the photographic apparatus 100 is placed in the operative condition the position of the housing section 2 against the housing section 1 is restricted by contact of the member 7 with the pin 206. What is shown as 8 is a member having its one end pivotally coupled with the housing section 2 by an axle 106 fixed at the housing section 2, and the other end of said member 8 is fixed at a part of said housing section 5, wherein the housing section 2 and the housing section 5 are pivotally coupled to each other through said member 8. What is shown as 9 is a member having its one end pivotally coupled to said housing section 5 by an axle 107 fixed at the housing section 5, and the other end of said member 9 is fixed at a part of the housing section 3, wherein said housing section 5 and said housing section 3 are pivotally coupled to each other through said member 9. What is shown as 10 is a member having its one end pivotally coupled with said housing section 1 by an axle 108 fixed at the housing section 1, and the other end of said member 10 is fixed at a part of said housing section 3, wherein said housing section 1 and said housing section 3 are pivotally coupled to each other through said member 10. And said housing section 5 is formed by a metal member 5a forming one wall of said exposure chamber 101 and an elastic cover 5b which is made of synthetic resin and covers outside of said metal member 5a, and a black metal coating is provided on the side planes of the metal member 5a forming the wall of the exposure chamber 101. And said housing section 3 is formed by a metal member 3a and an elastic cover 3b which is made of synthetic resin and covers outside of said metal member 3a, and a reflecting mirror 109 to have the object light beam being incident from said photographic lens-barrel 11 refracted to a direction of said exposure position in the housing section 1 when said photographic apparatus 101 is in said operative condition, is fixedly provided at a part (a part shown by oblique hatching lines in FIG. 3) forming other walls of the exposure chamber 101 out of said metal member 3a. And at a part of said housing section 3 not covering the exposure chamber 101, an opening 3c to allow the view finder housing 4 to move is formed. And finder lens $4_1$, $4_2$, $4_3$, $4_4$ placed on a common optical axis are provided within the view finder lens-barrel 4a of the view finder housing 4. And said view finder housing 4 is pivotally coupled to said housing section 3 by an axle 110 fixed on the housing section 3. And said finder housing 4 is rotatingly biased always to counter-clockwise direction around a fulcrum of said axle 110 by a spring 17 which has its one end fixed at the housing section 3 and the other end thereof being engaged with the finder housing 4. And a position restricting means (not shown in the drawing) is provided between said finder housing 4 and said housing section 3 so that when the photographic apparatus 100 is in said operative condition the optical axis $0_1$ of the view finder lens-barrel 13 provided at said housing section 2 and the optical axis $0_2$ of said finder housing 4 coincide with each other and form a common optical axis $0_1$–$0_2$. And further said finder housing 4 is so made that when the photographic apparatus 100 is placed from its operative condition into the folded condition it comes in contact with a pin 22 fixed within said housing section 1, and when said photographic apparatus 100 becomes to have a completely folded condition, it is positioned in about parallel with said housing section 3, and a cover 4b fixedly provided on said finder lens-barrel 4a closes the above mentioned opening 3c of said housing section 3.

In a foldable photographic apparatus according to the present invention having the above mentioned set up, when a connecting part between the housing sections 3 and 5 is pulled upward in a folded condition shown in FIGS. 2, 3, 5, a bellows 6 is stretched and at the same time the housing sections, 2, 5, 3 and the finder housing 4 are so activated as cooperating with each other into the operative condition shown in FIGS. 1, 4, 6, 7. That is, this operative condition provides a state ready for photographing, wherein said reflecting mirror 109 fixed at said housing section 3 is naturally placed at a position suitable for having an object light beam being incident through the photographic lens-barrel 11 refracted into a direction of the above mentioned exposure position within said housing section 1, and the optical axis $0_1$ of the view finder lens-barrel 13 and the optical axis $0_2$ of said finder housing 4 coincide into a common optical axis $0_1$–$0_2$. Therefore, when a photographer points the front plane of the housing section 2 toward an object and views through said view finder lens-barrel 4a, an eye of the photographer can see an image formed on the focal surface $13_2a$ of the condenser lens system $13_2$ through the finder lenses $4_1$, $4_2$, $4_3$, $4_4$ within the view finder lens barrel 4a, thus focusing adjustment of the photographic lens system 11a can be made by operating the operating dial 14 in a rotating manner while viewing the state of an image on the focal surface $13_2a$. And when a photographer views a view finder lens-barrel 4a, since the view finder lens-barrel 4a extends to a rear of the photographing apparatus 100, it is easy to view the finder. And when a flash photography using said flash apparatus 15 is desired, said flash apparatus 15 which is folded down within the housing section 2 is pulled up, then a switch of said flash control circuit is automatically closed, allowing the use of the flash apparatus 15, and when said flash apparatus is not in use it is folded down and housed within a flash housing chamber formed at the housing section 2, then said switch of the flash control circuit is opened.

And when the photographic apparatus 100 is not in use and is carried around, the connecting part of the housing sections 3 and 5 is pushed downward, then the bellows 6 is folded down and at a same time the housing sections 2, 5, 3 and the finder housing 4 are so activated as cooperating with each other into the folded position shown by FIGS. 2, 3, 5. That is, the housing section 2 is rotated to counter-clockwise direction around a fulcrum, an axle 105 in FIG. 4 and is housed into the chamber 1a within the housing section 1, and the finder housing 4 is housed in the chamber 1b, thus the folded condition shown by FIGS. 2, 3, 5 is obtained so that the apparatus 100 becomes to have a neat and compact shape, being able to be carried around in a pocket of a photographer.

Therefore, even if a photographic apparatus 100 of the present invention has such set up as having a finder lens system being independent from a photographic lens system for photographing, such set up can be secured that focusing adjustment of the photographic lens section and the focusing adjustment of the finder lens system can be made only within the housing section 2 at which the photographic lens system is provided, further the finder housing 4 provided at the housing section 3 extends to a rear of the apparatus 100, thus it has very useful effect in practical use. While this example is for a photographic apparatus of a self-developing type, the present invention is not necessarily limited to a self-developing type.

What is claimed is:
1. A foldable photographic apparatus, comprising:
 (a) holding means for supporting a photosensitive element in position for exposure;
 (b) means for forming a dark room for protecting said photosensitive element supported by said holding means from being exposed by unnecessary light, said means including:
   a plural number of housing section means being pivotally coupled to each other, wherein one of said housing section means is a basic housing section which works as a base, while other housing section means can be shifted from a folded position and to an operative position respectively against said basic housing section; and flexible opaque bellow means for forming a dark room completely shielded from light by shielding a portion which cannot be shielded from light by said housing section means;

(c) an objective lens for forming an image at a photosensitive element positioned for exposure by said holding means, said objective lens being provided within a front movable housing section means which comes to a front position of the apparatus out of said movable housing section means when the movable housing section means are shifted to said operative position;

(d) a mirror for reflecting light transmitted by said lens toward said photosensitive element, wherein said mirror is provided on a rear movable housing section means which comes to a rear part of the apparatus out of the movable housing section means when the movable housing section means are shifted to operative positions respectively; and (e) view finder optical lens means, having:

first finder optical lens means provided within the front movable housing section means, said first finder optical lens means having a plurality of lenses linearly arranged on the same optical axis, and being arranged so as to aim at an almost similar object as said objective lens; and second finder optical lens means pivotally coupled with the rear movable housing section means, said second finder optical lens means having a plurality of lenses arranged linearly on the same optical axis, and being so designed that the optical axis coincides with the optical axis of said first finder optical lens means.

2. An apparatus according to claim 1, in which said first finder optical lens means has an objective lens system and a condenser lens system which has focal surface at which object light beam passing through the objective lens system is imaged.

3. An apparatus according to claim 2, in which said condenser lens system is placed at the rearmost position in an optical system constituting said first finder optical means, and said second finder optical means can see an image on said focal surface of said condenser lens system.

4. An apparatus according to claim 1, in which a portion of said second finder optical lens means comes to form about the same plane with an outer surface of a rear movable housing section when the movable housing sections are in the folded condition.

5. An apparatus according to claim 1, in which a front movable housing section has a foldable flash apparatus pivotally coupled thereto and has a chamber to house said flash apparatus.

6. A foldable photographic camera using a sheet-shaped photosensitive element, and having a means to store a developing process agent and form visible images after processing operation by said processing agent in the storing means, comprising:

(a) holding means for supporting said photosensitive element in position for exposure;

(b) means for forming a foldable dark room for protecting said photosensitive element supported by said holding means from unnecessary light, said means including:

a base housing section means, having a first chamber for housing said holding means, a second chamber, a third chamber, and a film-advancing device for advancing said photosensitive element after exposure, processing said element with the process agent in the course of its advancement and for transferring said base housing section means exteriorly;

first secondary housing section means with its one end being pivotally coupled to said base housing section means, said first secondary housing section means being arranged in front of said dark room when it is positioned at said operative position, and being arranged in said second chamber of said base housing section means when it is positioned at said folded position, and having an objective lens for forming an image at a photosensitive element positioned for exposure by said holding means, and first finder optical lens means so provided as to aim at an almost same object as said objective lens aims at;

second secondary housing section means with its one end being pivotally coupled to said base housing section means at a position behind said first secondary housing means, said secondary housing section means being arranged at a predetermined angle to said base housing section means when it is at said operative position, and being arranged lying almost parallel to said base housing section means when it is at the folded position;

third secondary housing section means, having one end being pivotally coupled with the other end of said first secondary housing section means, and with its other end being pivotally coupled to the other end of said second secondary housing section means, said third secondary housing section means being arranged at a predetermined angle to said base housing section means when it is at said operative position, being arranged lying almost parallel to said base housing section means when it is at said folded position, and being designed so that its outer surface is at an almost same level as an outer surface of said second secondary housing section means and covers said second chamber of said housing section means; and flexible opaque bellows means for shielding portions which cannot be shielded from light by each of said housing section means to form the completely light-shielded dark room by said bellows means being engaged with each of said housing section means at a position more inward than said first finder optical means in such a manner that the object light passing through said first finder optical lens means of said first secondary housing section will not enter the dark room, said base housing section means, said first to third secondary housing section means and said flexible bellows means being shiftable to an operative position and a folded position in association with each other;

(c) a mirror for reflecting light transmitted by said lens toward said photosensitive element, said mirror being mounted on an inside wall of the dark room at a position above said second secondary housing section; and (d) second finder optical means pivotally coupled to said second secondary housing section means outside said dark room, said second finder optical means being shiftable to an operative position and a folded position in association with means for forming said dark room, being arranged at a position where its optical axis coincides with the optical axis of said first optical means when it is at said operative position, and being arranged within said third chamber of said base housing section means when it is at said folded position.

7. A foldable photographic apparatus, comprising:
(a) holding means for supporting a photosensitive element in position for exposure;
(b) means for forming a foldable dark room which protects said photosensitive element supported by said holding means from unnecessary outer light, said means including:
    base housing section means, having a first chamber, a second chamber and a third chamber, said first chamber housing said holding means;
    first secondary housing section means with its one end being pivotally coupled to said base housing section means, said first secondary housing section means being arranged in front of said dark room when it is at said operative position and being arranged in said second chamber of said base housing section means when it is at said folded position, and having an objective lens for forming an image at a photosensitive element positioned for exposure by said holding means, and a first finder optical lens means so provided as to aim at an almost same object as said objective lens aims at;
    second secondary housing section means with its one end being pivotally coupled with said base housing section means at a position behind said first housing section means, said second secondary housing section means being arranged at a predetermined angle to said base housing section means when it is at the operative section, and being arranged lying almost parallel to said base housing section means when it is at the folded position;
    third secondary housing section means with its one end being pivotally coupled with the other end of said first secondary housing section means and with its other end being pivotally coupled with the other end of said second secondary housing section means, said third secondary housing section means being arranged at a predetermined angle to said base housing section means when it is at the operative position, and being arranged lying almost parallel to said base housing section means with its outer surface being almost aligned to the outer surface of said second secondary housing section means and covering said second chamber of said housing section means;
    flexible opaque bellows means for forming a completely light-shielded dark room by shielding portions which cannot be light-shielded by each of said housing section means, said bellows means being engaged with respective housing section means at a position more inward than said first finder optical means in such a manner that the object light passing through said first finder optical lens means of said first secondary housing section, said base housing section means, said first to third secondary housing section means and said flexible opaque bellows means being shiftable to the operative position and the folded position in association with each other;
(c) a mirror for reflecting light transmitted by said lens toward said photosensitive element, said mirror being mounted on an inside wall of said dark room at a position above said second secondary housing section means; and
(d) second finder optical means pivotally coupled with said second secondary housing section means outside said dark room, said second finder optical means being designed to shift to an operative position and a folded position in association with the means for forming said dark room, with its optical axis being arranged at a position coincident to the position of the optical axis of said first optical means when it is at the operative position, and with its optical axis being arranged in said third chamber of said base housing section means when it is at the folded position.

8. An apparatus according to claim 7, in which said first finder optical lens means has an objective lens means and a condenser lens system having a focal surface at which object light beam passing through said objective lens system is imaged.

9. An apparatus according to claim 8, in which said condenser lens system is placed in the rearmost position in an optical system constituting said first finder optical means, and said second finder optical means can see an image on said focal surface of said condenser lens system.

10. An apparatus according to claim 7, in which a portion of said second finder optical means comes to form about the same plane with the external surface of said rear movable housing section when said movable housing sections are at said folded position.

11. An apparatus according to claim 7, in which a foldable flash device is pivotally coupled with said front movable housing section, and said section has a chamber to house the flash apparatus.

* * * * *